United States Patent [19]

Oda et al.

[11] Patent Number: 5,128,225
[45] Date of Patent: Jul. 7, 1992

[54] ELECTROPHOTORECEPTOR COMPRISING A CARRIER GENERATION LAYER CONTAINING A SILICONE-MODIFIED BUTYRAL RESIN

[75] Inventors: Yasuhiro Oda; Tomomi Homma; Yoshihide Fujimaki, all of Hachioji, Japan

[73] Assignee: Konica Corporation, Tokyo, Japan

[21] Appl. No.: 649,057

[22] Filed: Feb. 1, 1991

[30] Foreign Application Priority Data

Feb. 5, 1990 [JP] Japan .................................. 2-26367

[51] Int. Cl.$^5$ .............................................. G03G 5/14
[52] U.S. Cl. ...................................... 430/58; 430/60
[58] Field of Search .................................. 430/58, 60

[56] References Cited

U.S. PATENT DOCUMENTS 4,716,091 12/1987 Yoshihara et al. ................... 430/66
4,752,549 6/1988 Otsuka et al. ........................ 430/58

Primary Examiner—Marion E. McCamish
Assistant Examiner—S. Rosasco
Attorney, Agent, or Firm—Finnegan, Henderson, Farabow, Garrett and Dunner

[57] ABSTRACT

There is disclosed the electrophotoreceptor having excellent adhesiveness between the support and the photoconductive layer and capable of providing copied images of good quality without the reduction in a sensitivity and the increase in a residual potential. The electrophotoreceptor is characterized by that the photoconductive layer contains a silicone-modified butyral resin represented by the following Formula I:

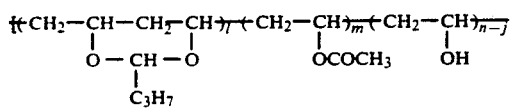

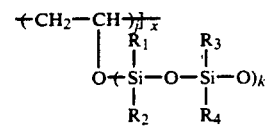

wherein $R_1$ to $R_4$ each represent an alkyl group, an aryl group and a hydroxyl group; the molar ratio l:m:n:j is 30 to 98:1 to 10:1 to 50:1 to 50; $n \geq j$; k is 1 to 1000; an x is 300 to 10000.

7 Claims, 1 Drawing Sheet

F I G. 1
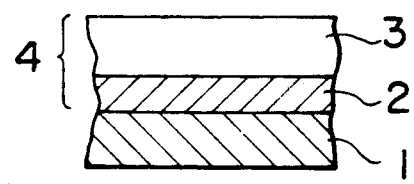
F I G. 2
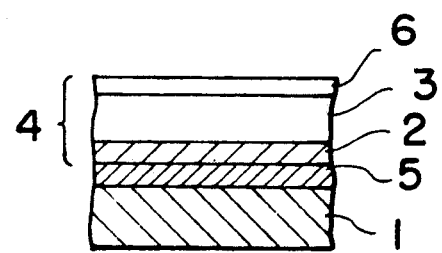

ELECTROPHOTORECEPTOR COMPRISING A CARRIER GENERATION LAYER CONTAINING A SILICONE-MODIFIED BUTYRAL RESIN

FIELD OF THE INVENTION

This invention relates to an electrophotographic copying operation and particularly to an electrophotoreceptor applicable to the electrophotographic copying operation.

BACKGROUND OF THE INVENTION

In recent years, organic photoconductive materials have been mostly used as the photoconductive materials applicable to electrophotoreceptors in place of inorganic photoconductive materials. That is why various combinations of the materials and conditions for synthesis make it possible to obtain a variety of the organic photoconductive materials; the freedom for selecting the materials can be expanded; and any desired photoreceptors can be readily prepared so as to meet the purposes of the applications.

Further, the organic photoconductive photoreceptors can be of a function-separated type, in which the different materials are responsible for carrier generation and carrier transport functions, whereby the freedom for selecting the materials can be further expanded and the electrophotographic characteristics such as chargeability, sensitivity and durability have been expected to improve.

In the field of the copying industry, demands for more improved image quality and image editorial functions promote the development of the recording apparatuses such as the copiers or printers of a digital system, and the improvements in the photoreceptors therefor have been strongly desired. Generally, a photoreceptor is dotwise exposed to a laser beam modulated by an image signal to form latent dot images thereon, which are developed to visible images in a reversal development system. A desirable laser beam-emitting equipment is such that can make an exposing unit simpler, smaller-sized and less expensive and has oscillating wavelength of the laser beam in the infrared region of not shorter than 750 nm. Therefore, the photoreceptor applicable thereto is required to have a high sensitivity at least in the wavelength region of 750 to 850 nm.

A variety of organic dyes and pigments have been proposed as the carrier generation materials applicable to the foregoing function-separated type photoreceptors, and there are available in the market polycyclic quinone pigments such as dibromoanthanthrone; pyrylium dye and the eutectic complexes of the pyrylium dye and polycarbonate; squalium pigment; phthalocyanine pigment; and azo pigment. Among them, Japanese Patent Publication Open to Public Inspections (hereinafter referred to as JP OPI) No. 239248/1986, 217050/1986, 67094/1987 and 218768/1988 disclose titanyl phthalocyanine pigments having a primary sensitivity in a long wavelength region of not shorter than 750 nm. Such titanyl phthalocyanine pigments have specific coagulative structures or specific crystal forms to shift main absorption wavelengths to longer wavelength regions and make sensitivities higher. However, it is so difficult to settle the optimum conditions for preparing the above pigments that they can not totally satisfy the characteristics such as a chargeability, sensitivity and repetitive property, and a further higher sensitivity is desired.

In the ordinary type electrophotoreceptors, an electric contact of a grounded conductive layer with a photoconductive layer is not uniform from microscopic viewpoint. For example, a local difference in the carriers supplied from the conductive layer causes a local difference in the charge distribution on the surface of the photoreceptor. This results in image defects such as white spots produced on a dark background in a positive development process and dark spots produced on a white background in a negative reversal development process. In particular, the dark spots produced in the reversal development process as well as a background fog seriously spoil the quality of images. The above problems are notably caused particularly in the foregoing highly sensitized photoreceptors, and the dark spots are seriously produced in the foregoing reversal development process.

For the purpose of improving the foregoing function-separated type laminated layers, a variety of auxiliary layers has positively been studied for increasing an adhesion of a photoconductive layer to a support, protecting physically and chemically a photoconductive layer, and improving in blocking the carriers supplied from a support and transporting them from layer to layer. In addition, the numerous studies on the binders for the photoconductive layers have also been made from the similar viewpoints.

As for the binders for a subbing layer, the hydrophobicresins such as a vinyl chloride/acetate-maleic acid copolymer and an ethylene type polymer are disclosed in JP OPI No. 47047/1981 and 218658/1985, respectively, in which the adhesion properties of a support and a photoconductive layer and the effect of blocking the free carriers supplied from the support are emphasized. Further, because of the advantages of easier manufacturing, a more excellent coating property, a higher blocking efficiency of free carriers, and a higher adhesion property, water-soluble polymers have also been studied for a subbing layer. However, such water-soluble polymer has the problem that it deteriorates environmental characteristics of a photoreceptor, that is, it degrades the stability of a charge potential and a residual potential under a high temperature and humidity.

Polyvinyl butyral is known to be excellent in adhesion property, compatibility between resins, chemical resistance, both thermoplastic and thermosetting properties as well as coating property and grain dispersion property. Generally, a polyvinyl acetal resin has unsatisfactory durability in repeated use. Particularly in the operation under a high temperature and humidity, the produced carriers are affected by a moisture absorbed therein and trapped in a charge generation layer, which results in deterioration in sensitivity and increase in a residual potential, so that the various advantages of the polyvinyl butyral including the adhesion property are hindered from displaying.

SUMMARY OF THE INVENTION

The objects of the invention are:
1. to provide a photoreceptor in which is excellent in dispersion property of the particles, coating property of a prepared paint, and adhesion between the component layers, and is capable of giving an excellent image quality;

2. to provide a photoreceptor which has a high sensitivity and an excellent environmental resistance and is neither lowered in sensitivity nor increased in residual potential at a high temperature and humidity;
3. to provide a photoreceptor which has excellent durability in repeated use; and
4. to provide a photoreceptor which has a high sensitivity to long wavelength light such as semiconductor laser beam, excellent charge maintaining property and less image defects, particularly, less dark spots in a reversal development process.

The above objects of the invention can be achieved by an electrophotoreceptor comprising a conductive support and provided thereon a photoconductive layer, wherein the photoconductive layer contains a silicone-modified butyral resin represented by the following Formula I;

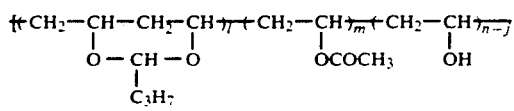

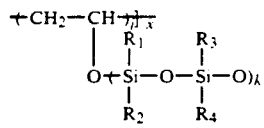

One of the preferable embodiments of the invention is an electrophotoreceptor comprising a function-separated type photoconductive layer in which a charge generation layer and a charge transport layer each containing an organic material are laminated.

BRIEF DESCRIPTION OF THE DRAWINGS

FIGS. 1 and 2 are the cross-sectional views each showing the structural examples of the photoreceptors of the invention, wherein
1—Conductive support,
2—Carrier generation layer,
3—Carrier transport layer,
4—Photoconductive layer,
5—Interlayer, and
6—Protective layer

DETAILED DESCRIPTION OF THE INVENTION

In the above Formula I, $R_1$ to $R_4$ represent each an alkyl, aryl and hydroxyl groups. The alkyl group is preferably methyl, and the aryl group is preferably phenyl. The molar ratio $l:m:n:j$ is 30 to 98:1 to 10:1 to 50:1 to 50; k is 1 to 1000; $n \geq jj$ and x is 300 to 10000, preferably 300 to 5000.

The foregoing silicone-modified butyral resins are preferably used singly as a binder resin for a charge generation layer or may be used in combination with other binder resins. They may be used as a binder resin for a transport layer singly or in combination with other binder resins.

The silicone-modified butyral resins of the invention can be prepared by subjecting polyvinyl butyral having the following Formula II and organopolysiloxane having the following Formula III to a dehydration reaction at 70° to 120° C. in a solvent such as toluene, xylene and diacetone alcohol in the presence of a platinum catalyst,

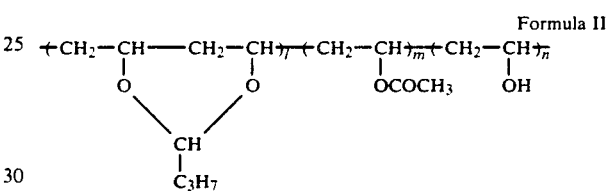

Formula II

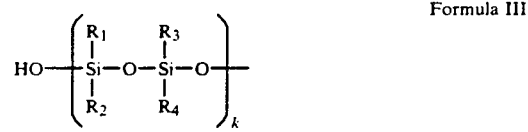

Formula III wherein $R_1$, $R_2$, $R_3$ and $R_4$ each are alkyl, aryl and hydroxyl group.

The exemplified resins synthesized in the above procedure are shown below.

| | l (mol %) | m (mol %) | n (mol %) | j (mol %) | k (Unit) | x (Unit) | $R_1$ | $R_2$ | $R_3$ | $R_4$ |
|---|---|---|---|---|---|---|---|---|---|---|
| SB-1 | 70 | 5 | 20 | 5 | 20 approx. | 1000 approx. |  | —OH |  | —OH |
| SB-2 | 65 | 3 | 22 | 10 | 20 approx. | 1700 approx. |  | —OH |  | —OH |
| SB-3 | 63 | 2 | 25 | 10 | 50 approx. | 650 approx. | CH₃— | CH₃— | —OH | —OH |
| SB-4 | 70 | 5 | 17 | 8 | 50 approx. | 1000 approx. | CH₃— | CH₃— | —OH | —OH |
| SB-5 | 70 | 5 | 17 | 8 | 70 approx. | 850 approx. | CH₃— | CH₃— |  |  |

The silicone-modified butyral resins of the invention are able to further demonstrate the desirable characteristics of the foregoing butyral resins and are also excellent in an adhesion property and a particle dispersibility, so that they are useful for dispersing the particles of a charge generation material (hereinafter referred to as CGM) and retaining the dispersion property.

CGM's applicable to the invention preferably contain phthalocyanine having the main sensitivity at least in a long wavelength range of not shorter than 750 nm. They can be used in combination with the other CGM's having the main sensitivities in a short wavelength region to prepare a photoreceptor having a sensitivity over a wide wavelength region.

The phthalocyanine pigments applicable to the CGM's used in the invention each having various crystal forms have been discovered in the course where an α type phthalocyanine pigment is converted to the β type having a stable crystal form. The examples thereof are X type metal-free phthalocyanine pigments disclosed in Japanese Patent Examined Publication (hereinafter referred to as JP EP No. 4338/1974) and the τ, τ', η and η' types of metal-free phthalocyanines disclosed in JP OPI's No. 182639/1983 and 19151/1985.

In particular, preferred is the titanyl phthalocyanine pigment which provides the Cu-Kα X-ray (wavelength: 1.54Å) diffraction spectrum having the the main peaks (Bragg angle 2θ) at 9.6±0.2 degrees and 27.2±0.2 degrees.

The above titanyl phthalocyanine pigments are different in the coagulative state of the pigment crystals from those disclosed in the above JP's, and have the specific X-ray diffraction spectra. They have the maximum absorption peaks in the range of 780 to 860 nm in the visible and near infrared absorption spectra, so that they can have a remarkably high sensitivity to a semiconductor laser beam. The basic structure of the above phthalocyanine pigments is represented by the following Formula Pc:

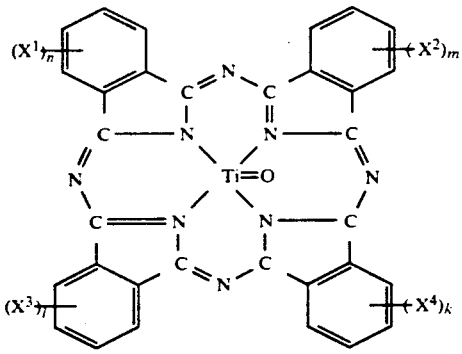

wherein $X^1$, $X^2$, $X^3$ and $X^4$ each represent a hydrogen atom, a halogen atom, an alkyl group, and an alkoxy group; and n, m, l and k each are an integer of 0 to 4.

The above X-ray diffraction spectra are measured under the following conditions:

| X-ray tube | Cu |
|---|---|
| Voltage | 40.0 KV |
| Current | 100.0 mA |
| Start angle | 6.00 deg. |
| Stop angle | 35.00 deg. |
| Step angle | 0.020 deg. |
| Measuring time | 0.50 sec. |

The titanyl phthalocyanine pigments used in the invention have the main peaks (Bragg angles 2θ) at 9.6±0.2 degrees and 27.2±0.2 degrees and, besides the above characteristic peaks, they have the other peaks at 11.7±0.2 degrees, 15.0±0.2 degrees, 23.5±0.2 degrees and 24.1±0.2 degrees.

Among the above titanyl phthalocyanine pigments, those having the diffraction strength at 9.6±0.2 degrees corresponding to 40% or more of that at 27.2±degrees are particularly preferable from the viewpoints of sensitivity and chargeability.

The CGM's preferably used in the invention are the bisazo pigments represented by the following Formula Ba and the triazo pigments represented by the following Formulas Ta₁ to Ta₃.

Cp—N=N—D—N=N—Cp      Formula Ba wherein D represents one of the following groups:

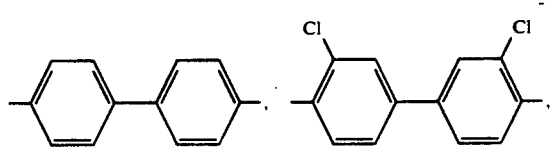

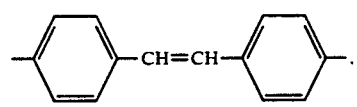

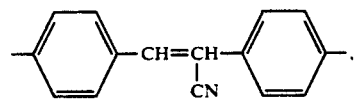

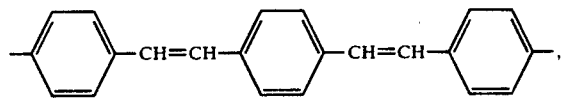

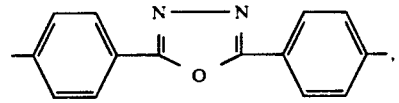

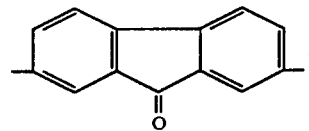

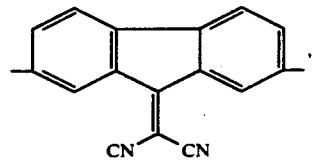

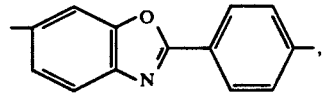

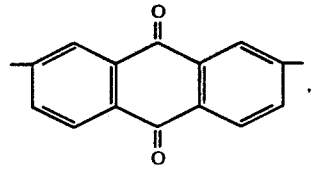

-continued

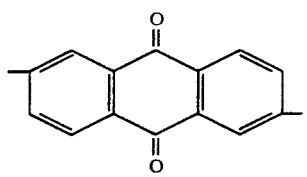

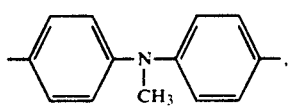

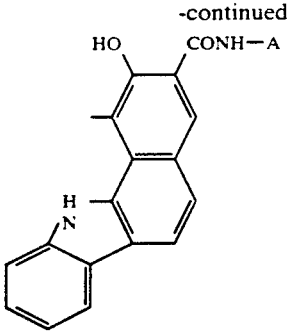

wherein A represents the following groups:

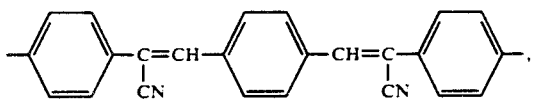

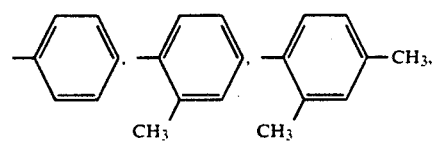

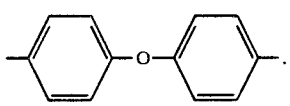

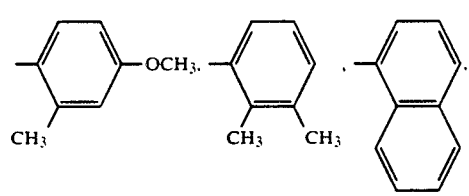

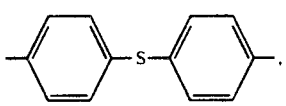

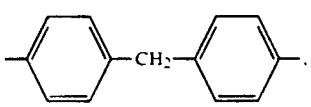

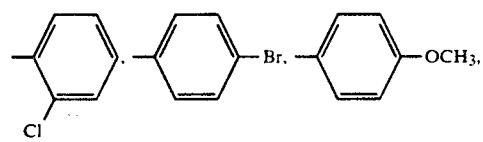

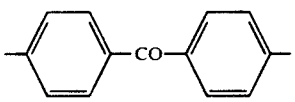

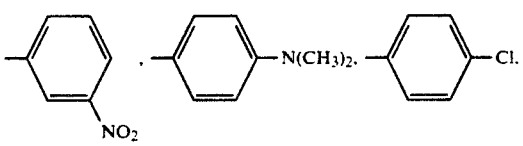

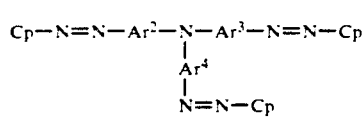  Formula Ta$_1$

  Formula Ta$_2$

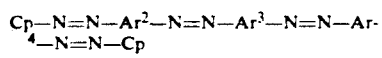  Formula Ta$_3$

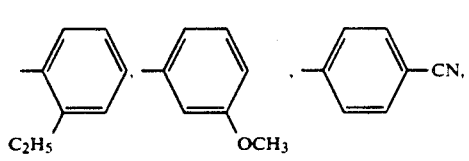

wherein Ar$^2$, Ar$^3$ and Ar$^4$ each represent a carbocyclic aromatic group.

Cp (coupler residue) in Formulas Ba and Ta$_1$ to Ta$_3$ represents the following groups:

Cp: 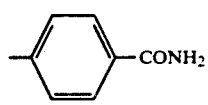

In the invention, the azulenium compounds represented by the following Formula Az are preferred, which are disclosed in the following patent publications:
a. JP OPI No. 1547/1986,
b. JP OPI No. 1548/1986,
c. JP OPI No. 15147/1986,
d. JP OPI No. 15150/1986, and
e. JP OPI No. 15151/1986

The azulenium compounds have the following Formula Az$_1$:

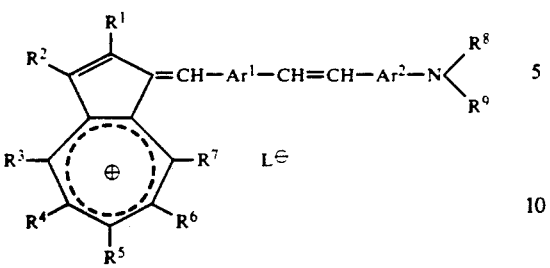

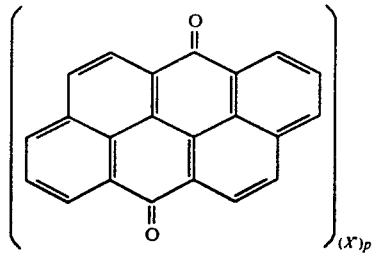

wherein $R^1$ to $R^7$ each represent a hydrogen atom, a halogen atom, and an organic residue, provided that any one of the combinations of $R^1$ and $R^2$, $R^2$ and $R^3$, $R^3$ and $R^4$, $R^4$ and $R^5$, $R^5$ and $R^6$, and $R^6$ and $R^7$ is allowed to form a condensed ring; $R^8$ and $R^9$ each represent alkyl, aryl and allyl groups, provided that $R^8$ and $R^9$ are allowed to form a ring together with a nitrogen atom; and $L^\ominus$ represents an anion residue.

The CGM used in the invention is the squalium pigment represented by the following Formula Sq:

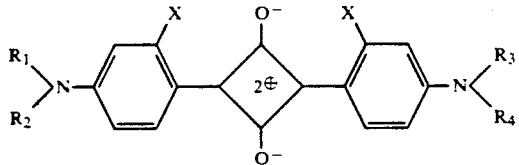

wherein $R_1$ to $R_4$ each represent alkyl and aryl groups each allowed to have a substituent; and X represents a hydrogen atom, a halogen atom, or an electron-donative group such as alkyl, hydroxyl and amino groups. The alkyl groups represented by $R_1$ to $R_4$ are preferably linear alkyl groups having 1 to 6 carbon atoms. The substituents for the aryl groups represented by $R_1$ and $R_2$ each are the above electron-donative groups and the electron-attractive groups such as nitro, nitrile, acyl, alkoxycarbonyl and carboxyl groups. The combination of $R_1$, $R_2$ and X is selected to the advantage of a tautomerism due to an electron transfer.

The alkyl groups contained in the substituents for the above aryl and the alkyl groups represented by X are preferably methyl.

In the invention, it is also allowed to use the above CGM's in combination with one or more kinds of the other CGM's. The CGM's used in combination are an anthraquinone pigment, a perylene pigment, a polycyclic quinone pigment and a squalic acid methine pigment.

The polycyclic quinone pigments having the groups of the following Formulas Q can also be used as the CGM:

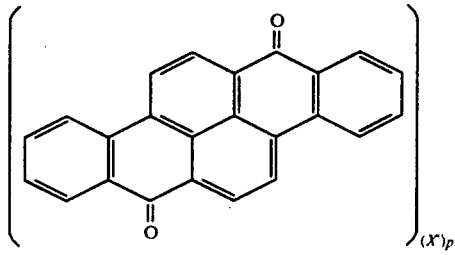

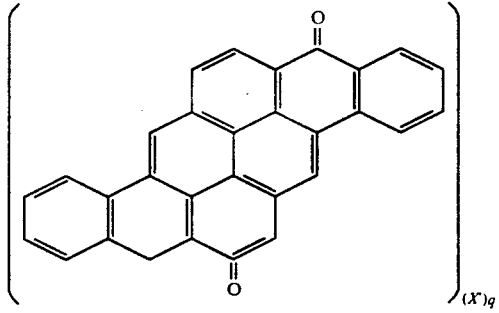

wherein $X'$ represents a halogen atom, or a nitro, cyano, acyl or carboxyl group; p is an integer of 0 to 4; and q is an integer of 0 to 6.

Where the above CGM is dispersed in a coating paint for a carrier generation layer(CGL), CGM is pulverized preferably to the particles having an average size of not larger than 2 μm, preferably not larger than 1 μm. Too large particle size deteriorates the dispersion of particles in a layer and also degrades surface smoothness due to the particles protruded on the surface of the layer, so that the protrusions sometimes cause discharge or adsorb toner particles thereon to give a chance to cause a toner filming phenomenon.

CGL and a carrier transport layer(CTL) are provided on a support to prepare a photoreceptor.

A variety of materials can be used as a carrier transport material(CTM). The examples thereof are the compounds having a nitrogen containing heterocycle and the condensed ring thereof, such as oxazole, oxadiazole, thiazole, thiadiazole and imidazole; polyarylalkane type compounds; pyrazoline type compounds; hydrazone type compounds; triarylamine type compounds; styryl type compounds; styryltriphenylamine type compounds; α-phenylstyryltriphenylamine type compounds; butadiene type compounds; hexatriene type compounds; carbazole type compounds; and condensed polycyclic ring type compounds.

The examples of the above CTM's are described in JP OPI No. 107356/1986. Some of them are shown below:

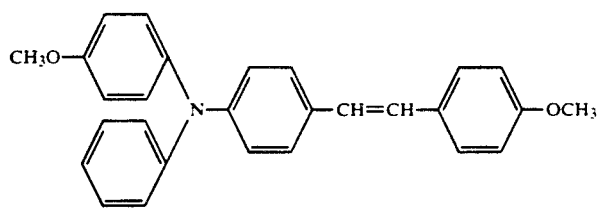
T-1
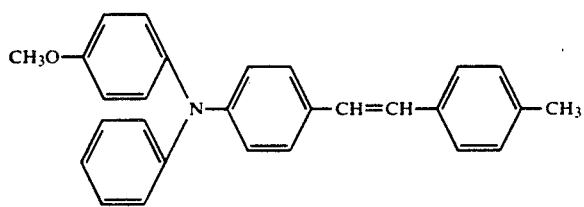
T-2
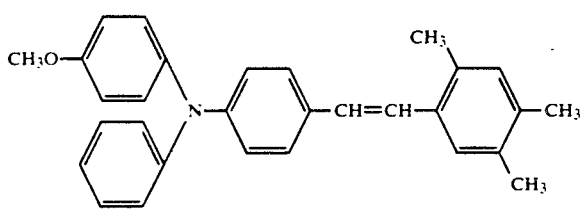
T-3
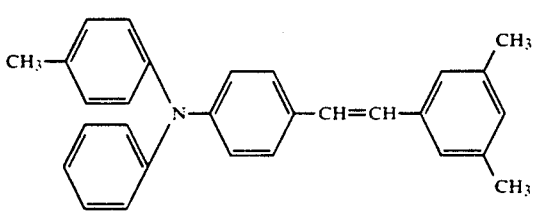
T-4
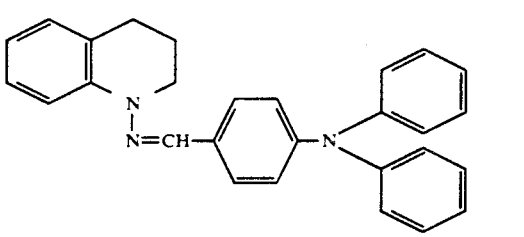
T-5
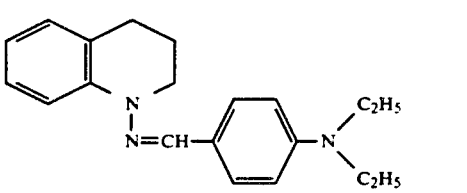
T-6
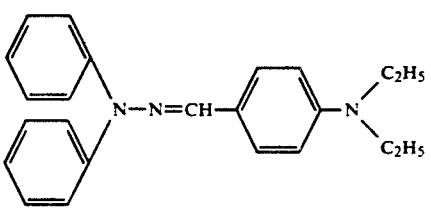
T-7

T-8
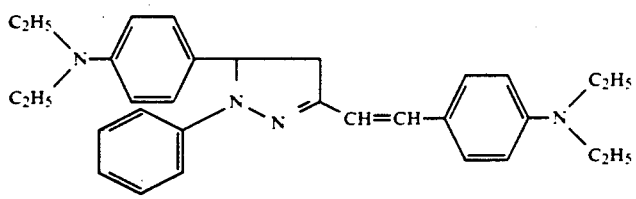
T-9
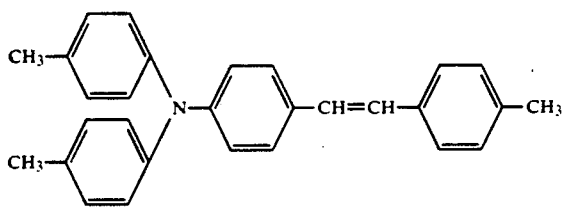
T-10
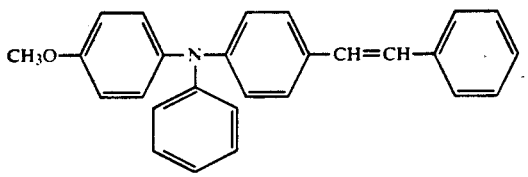
T-11
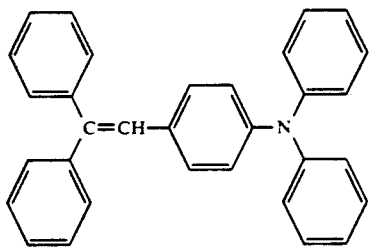
T-12
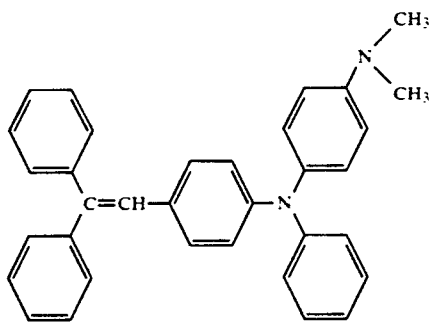
T-13
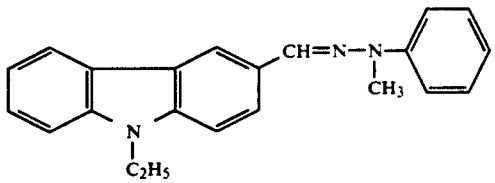
T-14
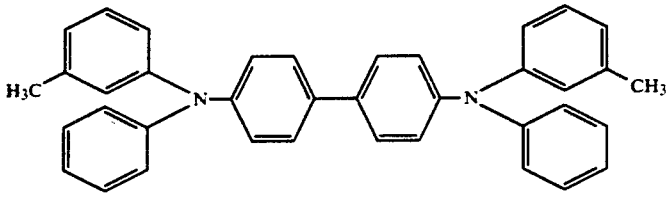

-continued

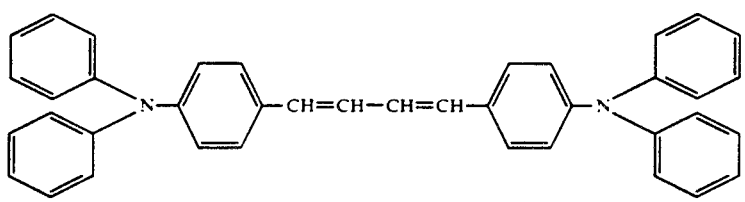
T-15

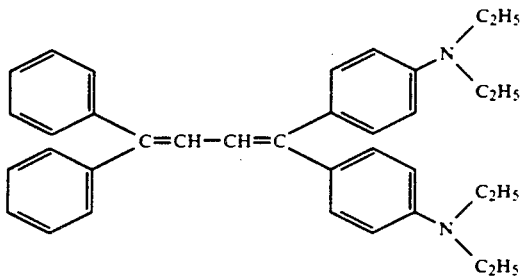
T-16

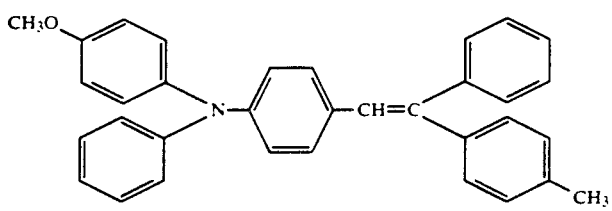
T-17

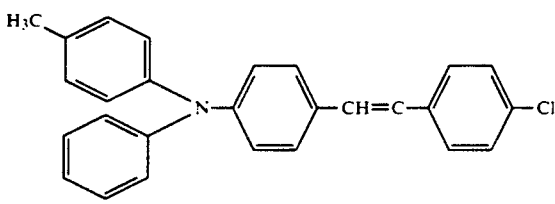
T-18

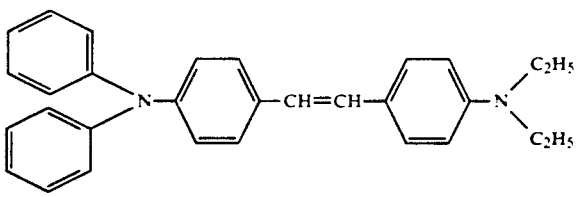
T-19

The binder resins applicable for forming CTL together with CTM and also applicable to CGL are preferably the hydrophobic resins having a film-forming ability including the following examples: polycarbonate, a polycarbonate Z resin, an acryl resin, a methacryl resin, polyvinyl chloride, polyvinylidene chloride, polystyrene, a styrene-butadiene copolymer, polyvinyl acetate, polyvinyl carbazole, a styrene-alkyd resin, a silicone resin, a silicone-alkyd resin, polyester, a phenol resin, polyurethane, an epoxy resin, a vinylidene chloride-acrylonitrile copolymer, a vinyl chloride-vinyl acetate copolymer, and a vinyl chloride-vinyl acetate-maleic anhydride copolymer.

The solvents or the dispersants applicable for forming CGL and CTL are butylamine, ethylenediamine, N,N-dimethylformamide, acetone, methyl ethyl ketone, cyclohexanone, tetrahydrofran, dioxane, ethyl acetate, butyl acetate, methylcellosolve, ethylcellosolve, ethylene glycol dimethylether, toluene, xylene, acetophenone, chloroform, dichloromethane, dichloroethane, trichloroethane, methanol, ethanol, propanol, and butanol.

The proportion of CTM to the binder resins is preferably 10 to 500 wt %. The thickness of CTL is preferably 1 to 100 μm, more preferably 5 to 30 μm.

In the invention, the silicone-modified butyral resin of Formula I applied to the photoconductive layer in the function-separated type photoreceptor can provide an excellent filming property and electrophotographic characteristics such as charge retainability, sensitivity and residual potential to a photoreceptor, so that the photoreceptor is less subjected to deterioration due to fatigue in repeated use and can display the stable performance without changes of the above characteristics.

The photoreceptive layer in the photoreceptor of the invention has a laminated layer structure. An electron receptive substance may be incorporated into any one or a plurality of a protective layer(OCL), CTL, CGL and an interlayer in order to improve a sensitivity and reduce a residual potential and fatigue caused in repeated use.

The examples of the electron receptive materials are succinic anhydride, maleic anhydride, dibromosuccinic anhydride, phthalic anhydride, tetrachlorophthalic anhydride, tetrabromophthalic anhydride, 3-nitrophthalic anhydride, 4-nitrophthalic anhydride, pyromellitic anhydride, mellitic anhydride, tetracyanoethylene, tetracyanoquinodimethane, o-dinitrobenzene, m-dinitrobenzene, 1,3,5-trinitrobenzene, p-nitrobenzonitrile, picryl chloride, quinonechlorimide, chloranyl, bromanyl, dichlorodicyano-p-benzoquinone, anthraquinone, dinitroanthraquinone, 9-fluorenylidenemalonodinitrile, polynitro-9-fluorenylidenemalonodinitrile, picric acid, o-nitrobenzoic acid, p-nitrobenzoic acid, 3,5-dinitrobenzoic acid, pentafluorobenzoic acid, 5-nitrosalicylic acid, 3,5-dinitrosalicylic acid, phthalic acid, mellitic acid, and the other compounds having a high electron affinity. The electron receptive substances is added in the proportion of 0.01 to 200 parts by weight and, preferably 0.1 to 100 parts by weight per 100 parts by weight of CGM.

Silicone oil may be added as a surface improver and an ammonium compound as a durability improver.

Further, a Uv absorber and an antioxidation agent may be added. A thermoplastic resin may be incorporated into OCL in a proportion of less than 50 wt % in order to improve processability and physical properties for preventing crack and providing flexibility.

The above interlayer functions as an adhesive layer or a blocking layer. In addition to the above binder resins, there can be used therefor polyvinyl alcohol, ethyl cellulose, cellulose acetobutyrate, carboxymethyl cellulose, nitrocellulose, casein, N-alkoxymethylated nylon, alcohol-soluble nylon, polyethylene, and polystyrene.

The surfactants preferably applicable to the invention are nonionic ones of a polyethylene glycol type and a polyhydric alcohol type, and anionic, cationic and ampholeric surfactants are liable to cause a problem of humidity resistance.

Of the nonionic surfactants, the most prepferable one is a fluorinated type and the next preferable ones are a silicone type and hydrocarbon type in this order.

The added amounts thereof are largely varied by paint composition and are $10^{-4}$ to 1.0 wt %.

The conductive supports used in the invention are as follows:
1. a metal plate such as aluminium and stainless steel;
2. paper or a plastic film laminated or vacuum evaporated thereon with a thin metal layer such as aluminium, palladium and gold; and
3. paper or a plastic film coated or vacuum evaporated thereon with a layer of an conductive compound such as conductive polymer, indium oxide and tin oxide.

As shown in FIGS. 1 and 2, the photoreceptors of the invention are provided on the conductive support 1 with the photoconductive layer 4 comprising CGL 2 and laminated thereon CTL 3. As shown in FIG. 2, the photoconductive layer 4 may be provided on the support 1 via the interlayer 5. The layer 4 with a dual-layer structure can provide the photoreceptor having the most excellent electrophotographic characteristics.

The protective layer 6 may be provided on the layer 4.

CGL 2 can be provided on the support 1 directly or via the layer 5 in following manner:

1. the solution dissolving CGM in a solvent is coated, or
2. CGM is finely pulverized in a dispersant with a ball mill or a sand grinder; the pulverized CGM is dispersed in a binder; and the resulting dispersion is then coated.

The coating methods are dip-coating, spray-coating, blade-coating and roller-coating methods.

The thickness of CGL 2 is 0.01 to 5 μm, preferably 0.05 to 3 μm.

The thickness of CTL 3 is 5 to 30 μm. The composition in CTL 3 is preferably 0.1 to 5 parts by weight of the binder vs. 1 part by weight of CTM. CGM may also be added thereto.

In CGL of a CGM-dispersed-in-binder type, one part by weight of CGM is added to 5 parts by weight or less of the binder.

EXAMPLES

The invention is explained with reference to the following examples.

EXAMPLE 1

Polyamide copolymer CM8000 manufactured by Toray Corp. of 3 parts was dissolved with heating in 100 parts of methanol and the resulting solution was filtered through a 0.6 μm-mesh filter. Then, the solution was coated on an aluminium drum by the dip-coating method to form a 0.4 μm-thick undercoat layer(UCL).

Next, the solution, in which 2 parts of the silicone-modified butyral resin SB-1 and 2 parts of titanyl phthalocyanine CG-I shown in Table 1 are dispersed in 100 parts of methyl ethyl ketone with a sand mill, was coated on UCL by the dip-coating method to form 0.2 μm-thick CGL.

Next, the solution, in which one part of CTM T-1, 1.5 parts of polycarbonate resin Iupilon Z 200 manufactured by Mitsubishi Gas Chemical Co. and a small amount of silicone oil KF-54 manufactured by Shinetsu Chemical Industry Co. were dissolved in 10 parts of 1,2-dichloroethane, was coated by the dip-coating method to form 22 μm-thick CTL, whereby the photoreceptor Sample 1 was prepared.

EXAMPLE 2

The photoreceptor Sample 2 was prepared in the same manner as in Example 1, except that the solution, in which 3 parts of cellulose acetate LT-35 manufactured by Daicell Chemical Co. was dissolved in 90 parts of 1,2-dichloroethane and 10 parts of ethanol, was coated.

EXAMPLE 3

The photoreceptor Sample 3 was prepared in the same manner as in Example 1, except that the resin for UCL was replaced with polyamide copolymer Luckamide 5003 manufactured by Dainippon Ink Co., the resin for CGL with the silicone-modified butyral resin SB-2, and CGM with CG-II shown in Table 1, respectively.

EXAMPLE 4

The photoreceptor Sample 4 was prepared in the same manner as in Example 1, except that the resin for CGL was replaced with the silicone-modified butyl resin SB-4 and CGM with CG-III shown in Table 1.

EXAMPLE 5

The comparative photoreceptor Sample 5 was prepared in the same manner as in Example 4, except that the resin for CGL was replaced with cellulose-modified silicone KR5240 manufactured by Shinetsu Chemical Industry Co.

EXAMPLE 6

The comparative photoreceptor Sample 6 was prepared in the same manner as in Example 2, except that the resin for CGL was replaced with polyvinyl butyral S-LEC BL-S manufactured by Sekisui Chemical Industy Co.

TABLE 1 irradiation at 0.7 mW was measured; and VH and VL were measured once again after completing the copying tests.

3. Black spots in reversal development:

Reversal development was carried out at a development bias of −560 V, and the number of the dark spots produced on the white background of the copied images was measured. The size and number of the black spots were measured by the image analyzer Omnicon 3000 manufactured by Shimazu Mfg. Co., wherein the number/cm$^2$ of the black spots having a diameter not smaller than 0.05 μm was measured. The evaluation criterion for the black spots was shown as follows:

Not more than one spot/cm$^2$: ◯
Not less than 2 spots/cm$^2$: ×

The evaluation results are shown in Table 2.

TABLE 2

| Sample No. | UCL binder | CGL binder | CGM | Adhesiveness | Black spot | Initial VH | Initial VL | After 50K print VH | After 50K print VL |
|---|---|---|---|---|---|---|---|---|---|
| 1 (Invention) | CM8000 | SB-1 | CG-I | 90/100 | O | 600 | 25 | 598 | 27 |
| 2 (Invention) | LT-35 | SB-1 | CG-I | 98/100 | O | 600 | 27 | 603 | 30 |
| 3 (Invention) | Luckamide 5003 | SB-2 | CG-II | 95/100 | O | 600 | 55 | 593 | 60 |
| 4 (Invention) | CM8000 | SB-4 | CG-III | 90/100 | O | 600 | 65 | 585 | 69 |
| 5 (Comparison) | CM8000 | KR5240 | CG-III | 0/100 | X | 600 | 65 | 545 | 120 |
| 6 (Comparison) | LT-35 | BLS | CG-I | 3/100 | X | 600 | 35 | 550 | 35 |

CG-I  Titanyl phthalocyanine disclosed in Synthesis Example 1 of Japanese Patent Application No. 170358/1989

CG-II

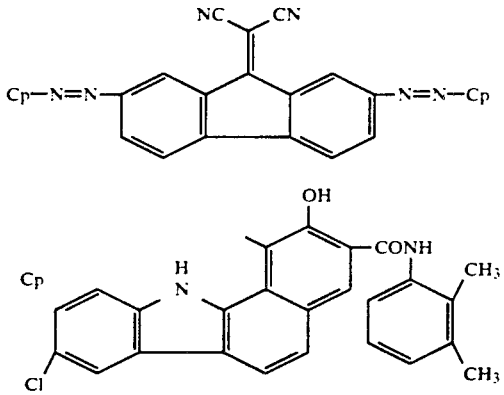

CG-III  X type metal-free phthalocyanine Fastogen Blue 8120S manufactured by Dainippon Ink Co.

Evaluation

1. Adhesiveness test:

A checkerboard pattern was formed on each of Samples 1 to 4 and Comparative Samples 5 and 6 in accordance with JIS K5400. Then, cellophane adhesive tapes were sticked on the checkerboard patterns and peeled off to observe the portions of the coated layers remaining on the aluminium drum, which is expressed by the ratio of the remaining portions to the initial ones.

2. Variations of potentials VH and VL in repeated use:

Each of the samples was mounted in a modified model U-Bix 1550 copier equipped with a semiconductor laser beam light source, manufactured by Konica Corp., and was subjected to continuous 50,000 times copying test, wherein the grid voltage was adjusted so that the potential VH in the unexposed portion became −600 V; the potential VL in the portion exposed to As can be seen from the above results, the electrophotoreceptors of the invention have higher chargeability and lower residual potential than those of the comparative photoreceptors.

It can also be found that the photoreceptors of the invention are excellent in adhesiveness between the subbing layer and the photoconductive layer and also can provide good image quality without producing black spots in the reversal development.

What is claimed is:

1. An electrophotoreceptor comprising a conductive support and provided thereon a photoconductive layer, wherein the photoconductive layer comprises:

a carrier generation layer containing a charge generation material and a silicone-modified butyral resin represented by the following Formula I:

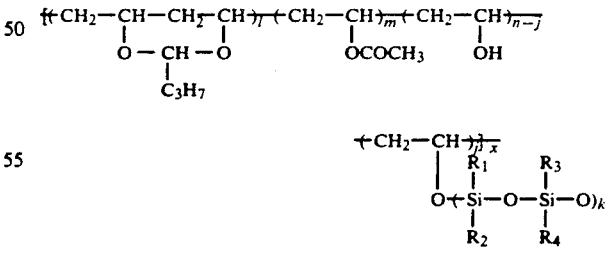

wherein $R_1$, $R_2$, $R_3$ and $R_4$ each represents an alkyl group, an aryl group or a hydroxyl group; the molar ratio l:m:n:j, with n≧j, is 30 to 98:1 to 10:1 to 50:1 to 50; k is 1 to 1000; and x is 300 to 10000;

and a carrier transport layer containing a carrier transport material.

2. The electrophotoreceptor of claim 1, wherein the carrier generation material has an absorption peak at a wavelength region not shorter than 750 nm.

3. The electrophotoreceptor of claim 2, wherein the carrier generation material is a titanyl phthalocyanine pigment having the peaks at the diffraction angles ($2\theta$) of 9.6±0.2 and 27.2±0.2 degrees in an X-ray diffraction spectrum with Cu-K$\alpha$ ray.

4. The electrophotoreceptor of claim 1, wherein the thickness of the carrier generation layer is 0.01 to 5 μm.

5. The electrophotoreceptor of claim 4, wherein the thickness of the carrier generation layer is 0.05 to 3 μm.

6. The electrophotoreceptor of claim 1, wherein the thickness of the carrier transport layer is 5 to 30 μm.

7. The electrophotreceptor of claim 1 wherein the silicone-modified butyral resin of Formula I is produced by the process of subjecting a compound of the Formula II:

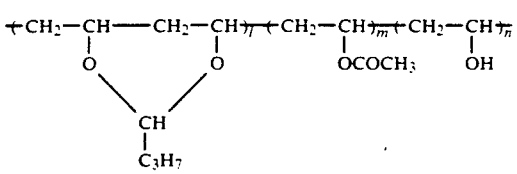

and a compound of the Formula III:

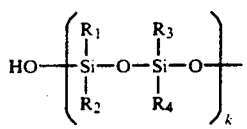

to a dehydration reaction, wherein $R_1$, $R_2$, $R_3$ and $R_4$ are as previously defined, the molar ratio l:m:n is 30 to 98:1 to 10:1 to 50, and k is as previously defined.

* * * * *